United States Patent [19]

Lee et al.

[11] Patent Number: 5,348,756

[45] Date of Patent: Sep. 20, 1994

[54] GELATIN GELS AND POWDERED MIXES THEREFOR

[75] Inventors: Thomas D. Lee, Scarsdale; Robert W. Wood, Brewster, both of N.Y.; Anne M. Addesso, Ringwood, N.J.

[73] Assignee: Kraft General Foods, Inc., Northfield, Ill.

[21] Appl. No.: 109,280

[22] Filed: Aug. 19, 1993

[51] Int. Cl.$^5$ ............................................. A23L 1/0562
[52] U.S. Cl. ................................................. 426/576
[58] Field of Search .......................................... 426/576

[56] References Cited

U.S. PATENT DOCUMENTS

| | | | |
|---|---|---|---|
| 2,519,961 | 8/1950 | Grettie | 426/576 |
| 3,147,125 | 9/1964 | Pintauro et al. | 426/576 |
| 3,364,036 | 1/1968 | Tesko et al. | 426/576 |
| 4,574,091 | 3/1986 | Steensen et al. | 426/548 |
| 4,615,897 | 10/1986 | Brown et al. | 426/576 |

OTHER PUBLICATIONS

Harris, Peter—Food Gels, pp. 223, 264. Elsevier Applied Science (London, 1990).

*Primary Examiner*—Jeanette Hunter
*Attorney, Agent, or Firm*—Thomas R. Savoie; Thomas A. Marcoux

[57] ABSTRACT

Fruit-flavored, powdered gelatin dessert mixes are formulated to obtain a relatively high pH of at least 4.15, and a relatively low gelatin load weight while still retaining a desirable sour taste. The mix contains adipic acid and fumaric and/or citric acid at a weight ratio of 15-21:1. The mix also contains soluble sodium buffer salts and soluble citrate buffer salts at a weight ratio of 0.9-2:1.

8 Claims, No Drawings

GELATIN GELS AND POWDERED MIXES THEREFOR

BACKGROUND OF THE INVENTION

1. Field of the Invention

Gelatin is widely known in the food industry for use in making gelled desserts. Powdered gelatin dessert mixes are used for the preparation of dessert gels in both home and food service settings. Refrigerated or shelf-stable ready-to-eat gelatin desserts; are also available.

2. Description of the Prior Art

The basic ingredients of gelatin dessert mixes are gelatin (either Type A or Type B or a blend of both), sweetening agent, which can be a natural sugar, such as sucrose, fructose or dextrose, or an intensive sweetener, such as saccharin, aspartame or acesulfame-K, acid, flavors and colors. Most of these mixes also use buffer salts to help in controlling the pH of the gel, as well as modifying the setting and melting characteristics of the gel. These salts are typically citrates, tartrates and/or phosphates. Sometimes a small amount of sodium chloride is added for added flavor enhancement. Gelatin of various Bloom strengths may be used, typically from 175 to about 275 Bloom range, with the amount of gelatin ranging between 4 and 15% by weight in the case of sugar-sweetened mixes. The higher the Bloom strength, the less gelatin will be required to produce the desired product. As might be expected higher Bloom gelatins are more expensive than lower Bloom gelatins.

A manufacturer of gelatin dessert mixes or ready-to-eat gelatin gels would desire to use the minimum level of gelatin and a low Bloom strength in order to lower raw material costs. However, typically a manufacturer targets for the mix to attain a certain level of gel strength which then, for a given pH, fixes the "gelatin load weights" required. "Gelatin load weight" is a parameter which account for the increased gel strength obtained with a given weight of gelatin as the Bloom strength increases.

It is also known that the gel strength of gelatin rapidly decreases as the solution pH is reduced below about 4.0. Conversely the higher the pH of a solution, the less gelatin is needed to obtain a gelled product having a desired gel strength. Gelatin dessert mixes, for example Jell-O ® Brand gelatin dessert mix, are typically fruit-flavored and thus have been formulated to produce a tart or sour taste by buffering the solution to a pH of around or below 4.0. It would therefore be desirable from an economic standpoint if the solution pH of the gelatin gel could be raised in order to reduce the required gelatin load weight. In commercial practice, however, this has not previously been feasible since the higher pH also decreases the sour taste and/or changes the taste profile of the gelled dessert. It would, therefore, be desirable if the pH could be raised without lowering the desired sour taste or changing the taste profile. A pH difference of less than about 0.2 will typically produce a noticeable taste difference to consumers.

It is therefore an object of this invention to provide for the preparation of gelatin gels which have an elevated pH, and hence a reduced gelatin load weight, and which also have the desired sour taste.

It is an object of this invention by means of proper selection of acid and buffer ingredients to raise the pH of gelatin dessert mixes or gels without reducing the sour taste of the mix or imparting any off taste.

These and other objects will be evident from the description herein. All percentages and ratios are by weight unless otherwise noted.

DESCRIPTION OF THE INVENTION

We have discovered that by modifying the ratio of food acids and by selecting the proper combination and ratio of buffer salts it is possible to raise the solution pH of powdered gelatin dessert gel mix or prepared gelatin gels without lowering the desirable sour taste of the gel. The elevated pH of the gel permits a reduction in the gelatin load necessary to obtain a desired gel strength.

Manufacturers of established food products are constantly seeking techniques to reduce the cost of raw materials used in their products. However, it is imperative that the desirable and expected characteristics of consumer food products not be adversely changed. In the case of taste of a popular food product, it is important that no perceptible flavor change be effected in order not to alienate loyal consumers of the product. Thus, although many opportunities to cost reduce a formula may be evaluated by food processors, it is seldom that reformulation can be effected due to accompanying change in the organoleptic properties of the product. It is particularly surprising that, in the case of gelatin dessert gel mixes, a significant pH change (i.e., greater than 0.2 units) can be effected without also incurring a significant or, at least, perceptible reduction in the sour taste of the product.

As an example of this invention, a gelatin dessert mix or gel which contains a combination of adipic and fumaric and/or citric acids at a ratio of about 9:1, contains disodium phosphate as the sole buffering salt, and has a fruit flavor system can be reformulated to increase the pH for 0.2 units or more without lowering the sour taste by employing an adipic acid to fumaric and/or citric acid ratio of from 15–21:1, preferably 16–20:1, and a combination of soluble phosphate and citrate salts at a ratio of 0.9–2:1, preferably 1.0–1.5:1, as the buffering agent. As will be recognized by those skilled in the art the reformulated gelatin dessert mix or gel will have a higher gel strength if the amount of gelatin is kept constant, or can be kept at the previous gel strength by reducing the amount of gelatin contained in the mix.

The gelatin mix or gel of this invention will typically be formulated into solution having a pH (at room temperature) of between 4.15 and 4.5, preferably 4.2 to 4.3. The buffer salt component, which will preferably consist of a combination of a phosphate salt selected from the group consisting of disodium phosphate, monocalcium phosphate, dipotassium phosphate and combinations thereof and a citrate salt selected from the group consisting of trisodium citrate, calcium citrate, tripotassium citrate and combinations thereof, will typically be present at a weight ratio to gelatin of 1:3.4 to 6.0. The weight ratio of food acids to gelatin will typically be 1:1.5 to 4.0.

This invention is further described having reference to the following examples.

EXAMPLE 1

A commercial, strawberry-flavored prior art gelatin dessert mix possesses the following composition:

| Ingredient | Parts By Weight |
| --- | --- |
| Sucrose | 75.5 |
| Gelatin | 6.5 |
| Adipic Acid | 2.04 |
| Disodium Phosphate | 0.6 |
| Flavor/Color | 0.3 |
| Fumaric Acid | 0.225 |

When made up to a gelled dessert according to recipe, the gel had a gel strength of about 26.5, a solution pH of about 3.9 and a sweet, sour/tart taste. The ratio of adipic to fumaric acid in the mix is about 9:1. It was found that merely increasing the level of disodium phosphate to effect a rise in pH predictably reduced the sour taste of the gel.

EXAMPLE 2

Utilizing the same ingredients Example 1, with the addition of trisodium citrate, a gelatin dessert mix was prepared according to this invention.

| Ingredient | Parts By Weight |
| --- | --- |
| Sucrose | 75.4 |
| Gelatin | 6.1 |
| Adipic Acid | 2.04 |
| Trisodium Citrate | 0.7 |
| Disodium Phosphate | 0.5 |
| Flavor/Color | 0.3 |
| Fumaric Acid | 0.115 |

Despite a reduction (versus Example 1) of gelatin in the amount of more than 6%, the gelled dessert, when made up in the manner of Example 1, had a gel strength of 25.7. The solution pH of the gel was elevated to 4.20; however, there was, as determined by taste testing, no reduction in sour taste from Example 1. In the mix the ratio of adipic to fumaric acid was 17.7:1 and the ratio of disodium phosphate to trisodium citrate was 1:1.4.

EXAMPLE 3

Utilizing the same ingredients and process in Example 1, with the addition of trisodium citrate, a gelatin dessert mix was prepared according to this invention.

| Ingredient | Parts By Weight |
| --- | --- |
| Sucrose | 75.3 |
| Gelatin | 6.1 |
| Adipic Acid | 2.142 |
| Disodium Phosphate | 0.6 |
| Trisodium Citrate | 0.6 |
| Flavor/Color | 0.3 |
| Fumaric Acid | 0.115 |

Despite a reduction (versus Example 1) of gelatin in the amount of more than 6%, the gelled dessert, when made up in the manner of Example 1, had a gel strength of about 25.8. The solution pH of the gel was elevated to 4.19; however, there was, as determined by taste testing, no reduction in the sour taste from Example 1. In the mix the ratio of adipic acid to fumaric acid was 18.6:1 and the ratio of disodium phosphate to trisodium citrate was 1:1.

EXAMPLE 4

When citric acid is used in lieu of fumaric acid, this invention is also applicable as shown by the following comparison of strawberry-flavored gelatins.

| | Parts By Weight | |
| --- | --- | --- |
| Ingredient | Control | Invention |
| Sucrose | 75.3 | 75.1 |
| Gelatin | 6.5 | 6.2 |
| Adipic Acid | 2.04 | 2.14 |
| Disodium Phosphate | 0.6 | 0.66 |
| Trisodium Citrate | — | 0.66 |
| Citric Acid | 0.225 | 0.125 |
| Flavor/Color | 0.2 | 0.2 |

The gel strength of the two gels was the same despite a reduction of 5% in the amount of gelatin. The taste of the two gels was the same despite a pH of 3.96 for the control and 4.30 for this invention. The formula of this invention had an adipic to citric acid ratio of 17.13:1 and a disodium phosphate to trisodium citrate ratio of 1:1.

EXAMPLE 5

This invention is also applicable to sugar-free gelatin dessert mixes as shown by the following comparison of strawberry-flavored gelatins.

| | Parts By Weight | |
| --- | --- | --- |
| Ingredient | Control | Invention |
| Gelatin | 5.2 | 4.9 |
| Adipic Acid | 1.6 | 1.68 |
| Disodium Phosphate | 0.495 | 0.495 |
| Trisodium Citrate | — | 0.495 |
| Aspartame | 0.4 | 0.4 |
| Maltodextrin | 0.3 | 0.3 |
| Flavor/Color | 0.3 | 0.3 |
| Fumaric Acid | 0.180 | 0.108 |

The gel strength of the two gels was 20.2 for the control and 19.7 for the invention despite a reduction of 5.5% in the amount of gelatin. The taste of the two gels was the same despite a pH of 3.94 for the control and 4.26 for this invention. The sugar-free formula of this invention had an adipic to fumaric acid ratio of 15.6:1 and a disodium phosphate to trisodium citrate ratio of 1:1.

EXAMPLE 6

Attempts to raise the pH of strawberry-flavored gelatin gels which resulted in a loss of sour flavor are set forth below and describe formulas which are not within the scope of this invention.

| | Parts By Weight | | |
| --- | --- | --- | --- |
| Ingredient | A | B | C |
| Sucrose | 75.3 | 75.4 | 75.3 |
| Gelatin | 6.0 | 6.089 | 6.072 |
| Adipic Acid | 2.3 | 2.04 | 2.142 |
| Trisodium Citrate | 0.65 | 0.7 | 0.68 |
| Disodium Phosphate | 0.45 | 0.5 | 0.54 |
| Fumaric Acid | 0.115 | 0.115 | 0.125 |
| Flavor/Color | 0.2 | 0.2 | 0.2 |
| pH | 4.11 | 4.2 | 4.18 |
| Gel Strength | 24.8 | 25.7 | 25.2 |
| % gelatin reduction | 7.87 | 6.5 | 6.8 |
| Adipic:Fumaric | 20:1 | 17.7:1 | 17.1:1 |
| DSP:TSC | .69:1 | .71:1 | .79:1 |

The formulas of this Example show that the total amount of buffer salts is not the controlling factor to achieve a satisfactory gelatin dessert gel.

Having thus described the invention, what is claimed is:

1. A fruit-flavored, gelatin dessert or gelatin dessert mix comprising sweetening agent, gelatin, food acids, soluble buffer salts, flavor agents and color agents wherein the food acids are selected from the group consisting of adipic, fumaric and citric, wherein the ratio of adipic acid to fumaric and/or citric acids is from 15–21:1, wherein the buffer salts are selected from the group consisting of phosphate salts and citrate salts and wherein the ratio of phosphate salts to citrate salts is 0.9–2:1.

2. The gelatin dessert or dessert mix of claim 1 wherein the sweetening agent is natural sugars and/or intensive sweeteners.

3. The gelatin dessert or dessert mix of claim 1 wherein the solution pH of the dessert or the dessert prepared from the dessert mix is from 4.15 to 4.5.

4. The gelatin dessert or dessert mix of claim 3 wherein the pH is from 4.2 to 4.3.

5. The gelatin dessert or dessert mix of claim 1 wherein the ratio of adipic acid to fumaric and/or citric acids is from 16–20:1.

6. The gelatin dessert or dessert mix of claim 1 wherein the phosphate salts are selected from the group consisting of disodium phosphate and monocalcium phosphate dipotassium phosphate and combinations thereof and the citrate salts are selected from the group consisting of trisodium citrate, calcium citrate tripotassium citrate and combinations thereof.

7. The gelatin dessert or dessert mix of claim 6 wherein the buffer salts are disodium phosphate and trisodium citrate.

8. The gelatin dessert or dessert mix of claim 7 wherein the ratio of disodium phosphate to trisodium citrate is from 1.0–1.5:1.

* * * * *